(12) United States Patent
Landwehr et al.

(10) Patent No.: US 8,142,749 B2
(45) Date of Patent: Mar. 27, 2012

(54) READILY-DENSIFIED TITANIUM DIBORIDE AND PROCESS FOR MAKING SAME

(75) Inventors: Sean E. Landwehr, Westmoreland, PA (US); Russell L. Yeckley, Westmoreland, PA (US)

(73) Assignee: Kennametal Inc., Latrobe, PA (US)

( * ) Notice: Subject to any disclaimer, the term of this patent is extended or adjusted under 35 U.S.C. 154(b) by 314 days.

(21) Appl. No.: 12/573,131

(22) Filed: Oct. 4, 2009

(65) Prior Publication Data

US 2010/0122903 A1 May 20, 2010

Related U.S. Application Data

(60) Provisional application No. 61/199,474, filed on Nov. 17, 2008.

(51) Int. Cl.
*C01B 35/04* (2006.01)
*H01B 1/02* (2006.01)

(52) U.S. Cl. .................. 423/297; 252/520; 252/520.21; 252/520.22; 252/521.4; 204/247.3; 204/243.1

(58) Field of Classification Search .................. 423/289, 423/297; 264/614, 618, 332; 204/247.3, 204/243.1; 252/520.2, 520.21, 520.22, 521.4
See application file for complete search history.

(56) References Cited

U.S. PATENT DOCUMENTS

| | | | |
|---|---|---|---|
| 2,915,442 A | 12/1959 | Lewis | |
| 3,028,324 A | 4/1962 | Ransley | |
| 3,151,053 A | 9/1964 | Lewis | |
| 3,156,639 A | 11/1964 | Kibby | |
| 3,215,615 A | 11/1965 | Ransley | |
| 3,274,093 A | 9/1966 | McMinn | |
| 3,314,876 A | 4/1967 | Ransley | |
| 3,330,756 A | 7/1967 | Ransley | |
| 3,400,061 A | 9/1968 | Lewis et al. | |
| 3,647,576 A | 3/1972 | Yamamura et al. | |
| 4,071,420 A | 1/1978 | Foster, Jr. et al. | |
| 4,097,567 A | 6/1978 | Cebulak et al. | |
| 4,181,583 A | 1/1980 | Steiger et al. | |
| 4,224,128 A | 9/1980 | Walton | |
| 4,353,885 A * | 10/1982 | Hoekje | 423/289 |
| 4,439,382 A | 3/1984 | Joo' et al. | |
| 4,465,581 A | 8/1984 | Juel et al. | |
| 4,478,693 A | 10/1984 | Ray | |
| 4,503,021 A | 3/1985 | Brynestad et al. | |
| 4,544,469 A | 10/1985 | Boxall et al. | |
| 4,670,110 A | 6/1987 | Withers et al. | |
| 4,865,701 A | 9/1989 | Beck et al. | |
| 4,983,340 A | 1/1991 | Montgomery | |
| 5,006,209 A | 4/1991 | Beck et al. | |
| 5,078,031 A | 1/1992 | Buljan et al. | |
| 5,227,045 A | 7/1993 | Townsend | |
| 5,746,895 A | 5/1998 | Sekhar | |
| 5,961,811 A | 10/1999 | Keller | |
| 6,497,807 B1 | 12/2002 | Brown et al. | |
| 6,719,890 B2 | 4/2004 | Brown | |
| 2004/0052713 A1 | 3/2004 | Boily et al. | |

FOREIGN PATENT DOCUMENTS

| | | |
|---|---|---|
| EP | 0102186 B1 | 12/1987 |
| GB | 2238318 A | 5/1991 |
| WO | WO 84/04713 | 12/1984 |
| WO | WO99/41431 | 8/1999 |

OTHER PUBLICATIONS

A.R. Keller et al., Effect of Microstructure on Dynamic Failure Resistance of Titanium Diboride/Alumina Ceramics, J. Am. Ceram. Soc., 86 [3] 449-57 (2003).
M-A. Einarsrud et al., Pressureless Sintering of Titanium Diboride with Nickel, Nickel Boride, and Iron Additives, J. Am. Ceram. Soc., 80 [12] 3013-20 (1997).
Baik et al., "Effect of Oxygen Contamination on Densification of TiB2", J. Am. Ceram. Soc., Aug. 1987, vol. 70, No. 8, 527-530.
Baumgartner et al., "Sintering and Properties of Titanium Dioboride Made from Powder Synthesized in a Plasma-Arc Heater", J. Am. Ceram. Soc., Mar. 1984, 207-212.
Sadoway, "Inert Anodes for the Hall-Heroult Cell: the Ultimate Materials Challenge", JOM, 53 (5), 34-35 (2001).
Niyomwas et al., "The effects of milling time on the synthesis of titanium diboride . . . synthesis", Songklanakarin J. Sci. Technol. 30 (2), 233-238, Mar.-Apr. 2008.
Sekhar, "A porous titanium diboride composite cathode coating for Hall-Heroult cells: Part 1. Thin Coatings", Met. and Mat Trans., Feb. 1998, 1-9.
Chamberlain et al., "Pressureless Sintering of Zirconium Diboride", J. Am. Ceram. Soc., 89 [2] 450-456 (2006).
Sobol et al., "Peculiarities of Structure State and Mechanical . . . ", Science of Sintering, 38 (2006) 63-72.
Schmidt et al., "Self-diffusion of transition metals in (Ti,W,Cr)B2 solid solutions", J. Mater. Sci. 41 (2006) 4233-4237.
Momentive Performance Materials, Inc., Titanium Diboride Powder (TiB2) Datasheet (2006).

* cited by examiner

*Primary Examiner* — Bruce Bell
(74) *Attorney, Agent, or Firm* — Matthew W. Gordon

(57) ABSTRACT

Additions of substitutional transition metal elements are made to improve the densifiability of titanium diboride while eliminating or minimizing the presence of deleterious grain boundary phases in the resultant bulk titanium diboride articles.

12 Claims, 1 Drawing Sheet

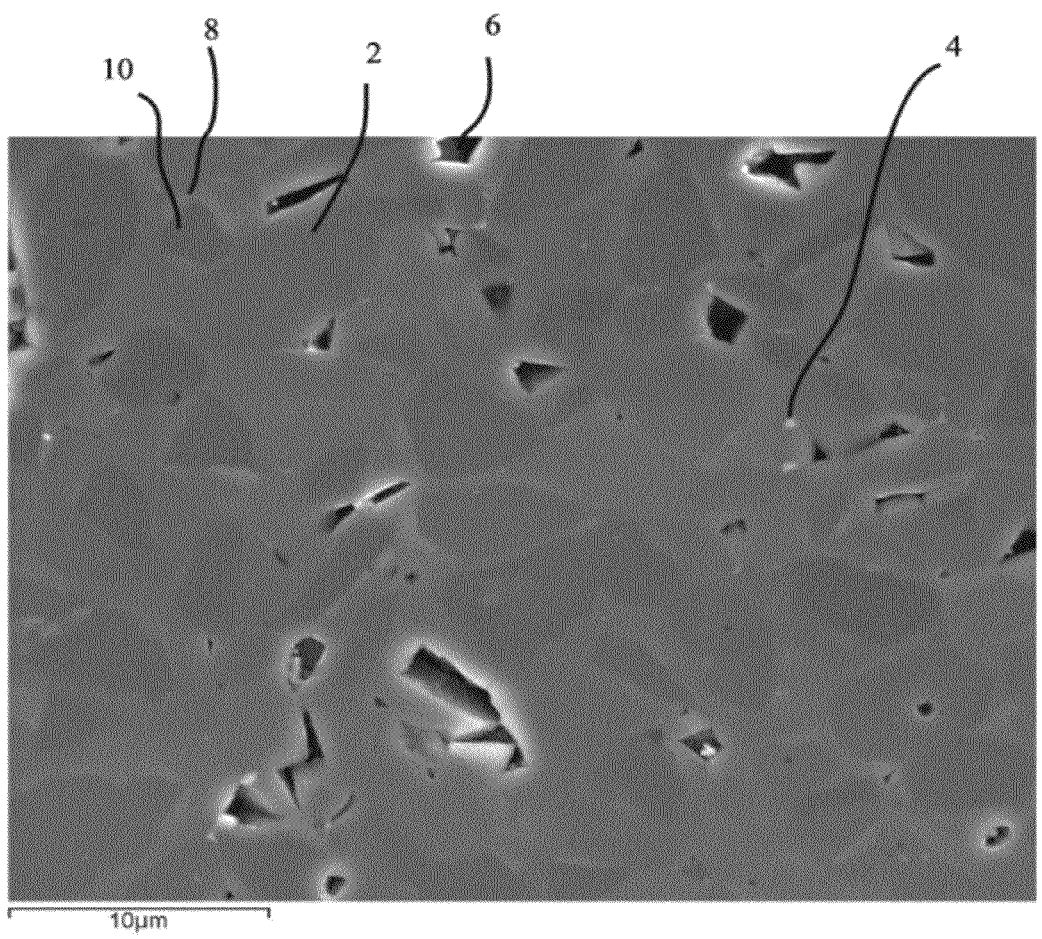

READILY-DENSIFIED TITANIUM DIBORIDE AND PROCESS FOR MAKING SAME

CROSS REFERENCE TO RELATED APPLICATIONS

The present application claims priority from provisional patent application Ser. No. 61/199,474, which was filed on Nov. 17, 2008, and is incorporated in its entirety herein by reference.

FIELD OF THE INVENTION

The invention relates to titanium diboride powder that is readily-densified by thermal processing. The invention also relates to the process for making such titanium diboride powder and to objects made from such titanium diboride powder.

BACKGROUND OF THE INVENTION

Titanium diboride ($TiB_2$) is a very chemically stable intermetallic compound formed between titanium and boron. Titanium diboride is extremely hard, nearly as hard as diamond, which makes it useful as a cutting tool. It also has good wear resistance and so is a good candidate for use in wear parts, wear resistant coatings, and seals. Titanium diboride is also tough enough to be used in some ballistic armor applications. It resists oxidation and does not react with many molten, nonferrous metals, including copper, zinc, and aluminum. Titanium diboride is an excellent conductor of both heat and electricity. Its chemical stability, conductivity, and high melting point make it useful in many high temperature manufacturing applications, for example, thermocouple protection tubes, crucibles for handling molten metals, boats for carrying materials through furnace hot zones, and vacuum metallizating process components. Titanium diboride is also used as an electrode material for electrolytic refining, or electrowinning, of some nonferrous metals, e.g., aluminum.

Titanium diboride does not occur naturally. Bulk titanium boride is produced as a powder that is then consolidated together by the application of pressure and high temperature. There are several conventional processes for synthesizing titanium diboride powder, for example: mechanically alloying together elemental powders of titanium and boron; carbothermally reducing titanium dioxide ($TiO_2$) in a reaction with one or more of boron oxide ($B_2O_3$), boron carbide ($B_4C$), titanium carbide (TiC), and carbon (C); solid state reacting titanium tetrachloride ($Ti_4Cl$), magnesium (Mg), and magnesium diboride ($MgB_2$); arc plasma reacting gaseous titanium tetrachloride ($Ti_4Cl$), boron trichloride ($BCl_3$), and hydrogen ($H_2$); and self-propagating high-temperature synthesizing from titanium dioxide ($TiO_2$), boron oxide ($B_2O_3$), and magnesium (Mg). These processes may include ancillary purifying steps to rid the titanium diboride powder of contaminants from the powder making process. They may also include mechanical milling steps to reduce the powder particle size and/or to deagglomerate the powder.

While submicron titanium diboride powders have relatively good sinterability due their high surface area-to-volume ratios, they are difficult and expensive to use because special handling precautions must be employed on account of their high pyrophoricity and propensity to oxidize. Coarser titanium diboride powders are relatively difficult to sinter because of several factors: the largely covalent nature of titanium diboride's chemical bonds, titanium diboride's low self-diffusion rates, and the formation of boron oxide on the powder surfaces. Thus, it is usually necessary to use expensive high temperature processes such as hot pressing and hot isostatic pressing to consolidate titanium diboride powders at high temperatures and pressures into blocks or other shapes. It is often necessary to machine the consolidated titanium diboride to achieve a desired useful component. The high hardness of titanium diboride makes the machining expensive.

The less-expensive ceramic powder processing methods of cold pressing a powder-plus-volatile binder mixture to shape followed by binder removal and furnace sintering to achieve a net or near-net shape do not work well with titanium diboride unless sinter aid materials are added to the powder. Sintering aids typically lower the sintering temperature while promoting densification. The lower sintering temperatures also help to avoid grain growth of the titanium diboride grains during the sintering furnace treatments. Known sintering aids for titanium diboride include iron (Fe), cobalt (Co), nickel (Ni), and chromium (Cr), all of which form relatively low-melting temperature eutectics with boron. Carbon (C) is another known sinter aid material, whose beneficial effects are thought to be due to its ability to reduce the boron oxide ($B_2O_3$) that coats the titanium diboride particle surfaces. Other known sinter aid materials for titanium diboride include several borides, e.g., chromium diboride ($CrB_2$) and nickel boride (NiB), and boron nitride (BN). It is generally necessary to use about 1-10 weight percent sintering aid to be effective.

Sintering aids may also be used to lower the temperatures and shorten the hold times for hot pressing or hot isostatic pressing temperature titanium diboride.

Conventional sintering aids, however, have their drawbacks. With the exception of carbon, all of the sinter aids identified above rely on causing the formation of grain boundary phases for their effectiveness, i.e., they result in the formation of additional phases at the grain boundaries of the titanium diboride grains. These grain boundary phases may lower the strength and toughness of the titanium diboride article. They may also make the titanium diboride article more susceptible to corrosive failure due to chemical attack at its grain boundaries, especially in extremely hostile, corrosive applications such as the use of titanium diboride article as a cathode in the electrowinning of aluminum.

What is needed is a new type of sinter aid for titanium diboride that does not result in the formation of grain boundary phases in the sintered titanium boride article.

Research by others has suggested that a small addition of tungsten carbide (WC) and cobalt may be used as sinter aid for another boride, i.e., zirconium diboride ($ZrB_2$), as disclosed by A. L. Chamberlain et al., "Pressureless Sintering of Zirconium Diboride," *Journal of the American Ceramics Society*, Vol. 89, Issue 2 (2006), pages 450-456. Those researchers speculate that a complex chemical reaction occurs during the sintering heat treatment cycle which results in some of the carbon from the tungsten carbide eliminating the boron oxide from the zirconium diboride particle surface and some of it forming zirconium carbide (ZrC). They also speculate that the tungsten (W) and zirconium carbide form a solid solution with the titanium diboride. The joint effect of these occurrences is to improve the sinterability of the cold pressed and sintered zirconium diboride powder. In addition to these suggested mechanisms, it is likely that the cobalt portion of the tungsten carbide-cobalt addition is acting in its conventional sinter aid role to improve the sinterability of the zirconium diboride.

SUMMARY OF THE INVENTION

It is an object of the present invention to provide a modified titanium diboride composition having improved sinterability over commercially pure titanium diboride. The term "commercially pure titanium diboride" is used herein and in the appended claims to refer to commercial grades of titanium diboride to which no intentional additions have been made.

It is also an object of the present invention to provide dense, bulk titanium diboride articles while eliminating or minimizing the deleterious grain boundary phases that are present in titanium diboride that has been processed with conventional sintering aids.

It is also an object of the present invention to provide a method for making a powder mixture containing titanium diboride which may be processed into dense, bulk titanium diboride articles.

It is also an object of the present invention to provide a method for producing titanium diboride articles while eliminating or minimizing the deleterious grain boundary phases that are present in titanium diboride that has been processed with conventional sinter aid materials.

It is an object of the present invention to provide a method for making dense, bulk titanium diboride articles suitable for use as cathodes in the electrowinning of aluminum.

The present invention achieves these objectives through the addition to titanium diboride of one or more of certain transition metal elements which form solid solutions with titanium diboride by substituting for titanium in some positions in the lattice of the titanium diboride crystal structure. These certain transition metal elements are tungsten, molybdenum, chromium, iron, cobalt, nickel, niobium and tantalum, and will be referred hereinafter and in the appended claims by the term "substitutional transition metal elements."

These substitutional transition metal elements may be provided in elemental form or in the form of their borides, carbides, oxides, carboxides, or halides, depending when they are added to the titanium diboride. Preferably, the element or elements that are part of the provided chemical compound with the substitutional transition metal elements become fugitive during the processing of the titanium diboride so that they do not remain in the bulk titanium diboride article in a form or amount that is deleterious to the intended purpose of the bulk titanium diboride article.

The substitutional transition metal elements may be added to titanium diboride at any time during the processing of the titanium diboride. For example, they may be added during the synthesis of the titanium diboride, in such case they may either (a) go fully into solid solution with the titanium diboride during the synthesizing process; (b) partly go into solid solution with the titanium diboride during the synthesizing process, leaving an excess of the transition metal element which will further enter into solid solution with the titanium diboride during the subsequent thermal processing of the titanium diboride powder into a bulk article; or (c) form an intimate mixture with titanium diboride such that the transition metal will enter into solid solution with the titanium diboride during subsequent thermal processing of the titanium diboride powder into a bulk article. The substitutional transition metal elements may also be mixed with titanium diboride powder such that they enter into solid solution with the titanium diboride during subsequent thermal processing of the titanium diboride powder into a bulk article. They may also be partly or completely mechanically alloyed into titanium diboride powder and upon subsequent thermal processing of the titanium diboride powder into a bulk article more fully enter into solid solution with the titanium diboride.

In some preferred embodiments of the present invention, the substitutional transition metal elements are provided in the form of their carbides in a manner which permits carbon from the substitutional metal element carbides to reduce the surface oxides of the titanium diboride during the thermal processing of the titanium diboride powder into a bulk article. In other preferred embodiments of the present invention, carbon is provided in addition to the substitutional transition metal elements in a form that permits the carbon to reduce the surface oxides of the titanium diboride during the thermal processing of the titanium diboride powder into a bulk article.

BRIEF DESCRIPTION OF THE DRAWINGS

The criticality of the features and merits of the present invention will be better understood by reference to the attached drawing. It is to be understood, however, that the drawing is designed for the purpose of illustration only and not as a definition of the limits of the present invention.

FIG. 1 is a scanning electron microscope image of the microstructure of bulk titanium diboride made according to the process set forth in Example 1.

DESCRIPTION OF PREFERRED EMBODIMENTS

In this section, some preferred embodiments of the present invention are described in detail sufficient for one skilled in the art to practice the present invention. It is to be understood, however, that the fact that a limited number of preferred embodiments are described herein does not in any way limit the scope of the present invention as set forth in the appended claims.

Titanium diboride has a hexagonal crystal structure which is described as a C32 structure based upon the aluminum diboride ($AlB_2$) model under the Strukturbericht notation system with lattice constants of a=3.03 Angstroms (basal plane) and c=3.22 Angstroms (vertical axis), and by space group P6/mmm with one formula unit per unit cell under the Hermann-Mauguin system. Structurally, the lattice is a hexagonal metal lattice having boron atoms on virtually all interstitial sites.

In accordance with the present invention, the substitutional transition metal elements form a solid solution with titanium diboride by replacing some of the titanium atoms in the lattice of the titanium diboride crystal structure. Without wishing to be bound, the inventor believes that the migration of the substitutional transition metal elements to, as well as their presence on, these lattice sites increases the sinterability of the titanium diboride while avoiding or minimizing the formation of deleterious grain boundary phases, such as those which would increase the susceptibility of the bulk titanium diboride article to intergranular corrosion.

The substitutional transition metal elements usable in the present invention are tungsten, molybdenum, chromium, iron, cobalt, nickel, niobium and tantalum. One or more of the substitutional transition metal elements may be used at a time, so long as their total concentration does not cause the precipitation of one or more secondary phases that are detrimental to the intended use of the bulk titanium diboride article.

In accordance with the present invention, the substitutional transition metal elements may be added at any stage of the processing of the titanium diboride. For example, it may be added during the synthesizing stage of the titanium diboride powder, e.g., by including a component bearing the substitutional transition metal element among the reactants that form the titanium diboride. In such case, the substitutional transition metal element may either (a) go fully into solid solution with the titanium diboride during the synthesizing process; (b) partly go into solid solution with the titanium diboride during the synthesizing process, leaving an excess of the transition metal element which will further enter into solid solution with the titanium diboride during the subsequent thermal processing of the titanium diboride powder into a bulk article; or (c) form an intimate mixture with titanium diboride such that the substitutional transition metal element will enter into solid solution with the titanium diboride during subsequent thermal processing of the titanium diboride powder into a bulk article.

The substitutional transition metal elements may also be mixed with titanium diboride powder in a form which allows them to go into solid solution with the titanium diboride during subsequent thermal processing of the titanium diboride powder into a bulk article. Additions at this stage are preferably done by milling commercially pure titanium diboride powder together with a powder bearing the substitutional transition metal elements, e.g., in a ball mill or an attritor mill, for sufficient time to result in a homogenous mixture while maintaining the particle size of the component powders in a range that will not result in excessive oxidation or powder handling problems. A volatile pressing binder and/or die lubricant, such as are well-known in the ceramic powder industry, may be also be added to the powder mixture, either during the milling process or thereafter. The powder mixture may also be made by blending the commercially pure titanium diboride powder together with a powder bearing the substitutional transition metal elements into a homogeneous mixture.

In some embodiments of the present invention, the substitutional transition metal elements may be added by milling commercially pure titanium diboride powder in a mill having a lining and/or milling media which contain the substitutional transition metal elements. In these embodiments, the wear of the mill components during the milling of the titanium diboride powder effectively results in the addition of the substitutional transition metal elements to the titanium diboride powder. However, a possible drawback of these embodiments is that the size of some of the particles that break off of the mill lining and/or milling media may be too large to fully dissolve in the titanium diboride during the subsequent consolidation processing of the powder into a bulk titanium diboride article. These undissolved particles remain as contamination in the microstructure of the bulk titanium diboride article.

The substitutional transition metal elements may also be partly or completely mechanically alloyed into titanium diboride powder and upon subsequent thermal processing of the titanium diboride powder into a bulk article more enter into full solid solution with the titanium diboride. Preferably, the mechanical alloying is accomplished by way of ball milling or attritor milling commercially pure titanium diboride powder with the substitutional transition metal elements in the form of a metal powder. A volatile pressing binder and/or die lubricant, such as are well-known in the ceramic powder industry, may be also be added to the resulting mechanically alloyed powder, either during the milling process or thereafter.

The amount of the substitutional transition metal element to be added to the titanium diboride depends not only on the intended use of the bulk titanium diboride article, but also on the stage in the processing of the titanium diboride in which the substitutional transition metal is added and the form in which it is added, e.g., in elemental form or in the form of a boride, carbide, oxide, carboxide, or halide. In all cases, the amount of the substitutional transition metal elements present is to be less than the amount which would cause the precipitation of one or more secondary phases that are detrimental to the intended use of the bulk titanium diboride article.

It is generally preferred, in accordance with the present invention, that the amount of substitutional transition metal elements present in the bulk titanium diboride article be in the range of about 0.5 to about 3.5 weight percent. It is also generally preferred that the amount of substitutional metal elements present in the overall powder composition present in powder mixtures or mechanically alloyed powders of titanium diboride and substitutional transition metal elements prepared according to the present invention be in the range of about 0.5 to about 3.5 weight percent (excluding the weight of any volatile pressing binder and/or lubricant that might be present).

Where the substitutional transition metal elements are added in the forms of borides, carbides, oxides, carboxides, or halides, it is preferred that the element or elements that are part of the provided chemical compound with the substitutional transition metal elements become fugitive during the processing of the titanium diboride so that they do not remain in the bulk titanium diboride article in a form or amount that is deleterious to the intended purpose of the bulk titanium diboride article. In other embodiments of the present invention using such compounds, the non-substitutional transition metal elements may be dissolved in the titanium diboride, either elementally, or as part of a dissolved compound.

The powders made according the present invention may be processed into bulk titanium diboride articles by various means. For example, the powders may be cold pressed, e.g., by die pressing or cold isostatic pressing, and then sinter heat treated in a furnace using a predetermined time/temperature/atmosphere treatment cycle selected to acquire the desired relative density, grain size, and mechanical properties. The powders may also be hot pressed or hot isostatically pressed into bulk titanium diboride articles. It is also within the contemplation of the present invention to use a combination of any of the foregoing consolidation methods, e.g., articles consolidated initially by cold pressing and sintering may subsequently be hot isostatically pressed to further enhance their desired properties.

Bulk titanium diboride articles according to the present invention have microstructures consisting essentially of a single phase and are essentially free of grain boundary phases. The single phase is a solid solution comprising the substitutional transition metal element as a solute and titanium diboride as the solvent. As used herein and the appended claims, the phrase "consisting essentially of a single phase" is to be construed as meaning that the microstructure contains only the described solid solution phase along with incidental amounts of other phases that result from the possible presence of impurities in the commercially pure titanium diboride powder that was utilized in practicing the invention or from unavoidable contamination occurring during the practicing of the invention, e.g., undissolved particles from a milling operation. Similarly, the phrase "essentially free of grain boundary phases" is to be construed as meaning the microstructure has no grain boundary phases that cannot be attributed to the possible presence of impurities in the commercially pure titanium diboride powder that was utilized practicing the invention. It is to be understood that while the single phase is a solid solution of the substitutional transition metal elements in titanium diboride, the concentration of the substitutional transition metal elements in solution may vary from location to location within a grain of the phase and from grain to grain.

In some embodiments wherein during the processing the substitutional transition metal element was added in the form of a compound, e.g., a carbide, the phase may also have at least some of the non-substitutional transition metal components of that compound as a solute, either elementally or as part of a dissolved compound.

EXAMPLES

Example 1

In this example of an embodiment of the present invention, commercially pure titanium diboride powder having a starting particle D50 size 3.0 microns, as measured by laser diffraction, was milled for 8 hours in a ball mill lined with tungsten carbide—6 weight percent cobalt grade using milling media of the same tungsten carbide—cobalt grade to a final particle D50 size of 2.3 microns. The milling fluid was lacolene. After milling, the milling fluid was evaporated and the powder was hot die pressed in a 12.7 cm (5 inch) diameter graphite die at 1900° C. and a pressure of 30 MPa for 0.75-1.25 hours under vacuum to achieve a final thickness of 1.27 cm.

The density of resultant bulk titanium diboride was measured to be 4.56 grams/cubic centimeter, which is greater than the theoretical full density value of 4.54 grams/cubic centimeter for titanium diboride. This indicates the presence of tungsten and cobalt in the bulk titanium diboride.

X-ray diffraction analysis of the resultant bulk titanium diboride detected only titanium diboride. No peak shifting was observed, but this is to be expected for low levels of tungsten and cobalt in solution in titanium diboride. A sample of the resultant bulk titanium diboride was polished and examined in a scanning electron microscope. The microstructure is shown in FIG. 1. The microstructure consists of grains of a primary phase 2, along with some undissolved tungsten carbide-cobalt particles 4 and some void areas 6 which are artifacts of the polishing process resulting from the pulling out of some grains from the microstructure by the polishing media (the whitish areas around the void areas 6 are artifacts due to overcharging of the void edges). The undissolved tungsten carbide cobalt particles 4 are contamination from the milling process.

In the microstructure shown in FIG. 1, some of the grains of the primary phase 2 are revealed by the scanning electron microscope to consist of a light grey outer portion 8 and a dark grey inner portion 10. Energy-dispersive X-ray analysis (also known as EDS analysis) reveals that while both the outer and inner portions 8, 10 of the primary phase 2 are titanium diboride, the outer portion 8 is rich in tungsten whereas the inner portion 10 is not. This indicates that the tungsten is in solid solution in the titanium diboride and the concentration of the tungsten in solution varies throughout the single phase grain.

Samples of the resultant bulk titanium diboride have been submitted for evaluation as cathodes in the Hall-Héroult cell for the electrowinning of aluminum.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

What is claimed is:

1. A composition of matter having a titanium diboride crystal lattice, the composition being a solid solution consisting essentially of a titanium diboride solvent and a solute of at least one substitutional transition metal element selected from the group consisting of tungsten, molybdenum, iron, cobalt, nickel, niobium, and tantalum, wherein the at least one substitutional transition metal element occupies a titanium site of the titanium diboride crystal lattice wherein the amount of the at least one substitutional transition metal element in the solid solution is in the range of about 0.5 to about 3.5 weight percent and the composition has a microstructure consisting essentially of a single phase and the microstructure is essentially free of grain boundary phases.

2. The composition of matter of claim 1, wherein the substitutional transition metal element is at least one selected from the group consisting of tungsten and cobalt.

3. An article comprising a solid solution having a titanium diboride crystal structure, the solid solution consisting essentially of a titanium diboride solvent and a solute of at least one substitutional transition metal element selected from the group consisting of tungsten, molybdenum, iron, cobalt, nickel, niobium, and tantalum, wherein the at least one substitutional transition metal element occupies a titanium site of the titanium diboride crystal lattice, the amount of the at least one substitutional transition metal element in the solid solution is in the range of about 0.5 to about 3.5 weight percent, and the article has a microstructure consisting essentially of a single phase and the microstructure is essentially free of grain boundary phases.

4. The article of claim 3, wherein the substitutional transition metal element is at least one selected from the group consisting of tungsten and cobalt.

5. The article of claim 3, wherein the article is an electrode.

6. The article of claim 5, wherein the electrode is an electrode of an electrolytic refining cell.

7. The article of claim 6, wherein the electrolytic refining cell is for electrowinning aluminum.

8. A method of making a titanium diboride article comprising the steps of:
   a) providing a first powder consisting essentially of titanium diboride;
   b) providing a second powder consisting essentially of at least one substitutional transition metal element selected from the group consisting of tungsten, molybdenum, iron, cobalt, nickel, niobium, tantalum, and their oxides, carbides, carboxides, and halides;
   c) milling together the first powder with the second powder to produce a milled powder;
   d) compacting the milled powder under pressure;
   e) heating the compacted milled powder to sinter the compacted milled powder into an article;
      wherein the article comprises a solid solution having a titanium diboride crystal lattice, the titanium diboride crystal lattice has the at least one substitutional transition metal element occupying titanium lattice sites, the amount of the at least one substitutional transition metal element in the solid solution is in the range of about 0.5 to about 3.5 weight percent, and the article has a microstructure consisting essentially of a single phase and the microstructure is essentially free of grain boundary phases.

9. The method of claim 8, further comprising the step of providing carbon powder and wherein step (c) further comprises milling the carbon powder together with the first and second powders to produce the milled powder having a powder particle surface coating oxide, and the amount of carbon powder in the milled powder is no more than the amount needed to reduce the oxide during step (e).

10. The method of claim 8, further comprising the step of providing the article with the shape of an electrode.

11. A method of making a titanium diboride article comprising the steps of:

a) providing a powder consisting essentially of titanium diboride;
b) providing a mill having cemented tungsten carbide cobalt lining;
c) milling the powder in the mill to produce a milled powder of titanium diboride having particles of the cemented tungsten carbide cobalt lining;
d) compacting the milled powder under pressure;
e) heating the compacted milled powder to sinter the compacted milled powder into an article;
   wherein the article comprises a solid solution having a titanium diboride crystal lattice, the titanium diboride crystal lattice has at least one substitutional transition metal element selected from the group consisting of cobalt and tungsten occupying titanium lattice sites, wherein the amount of the at least one substitutional transition metal element in the solid solution is in the range of about 0.5 to about 3.5 weight percent, and the article has a microstructure consisting essentially of a single phase.

12. The method of claim 11, further comprising the step of providing the article with the shape of an electrode.

* * * * *

UNITED STATES PATENT AND TRADEMARK OFFICE
CERTIFICATE OF CORRECTION

| | | |
|---|---|---|
| PATENT NO. | : 8,142,749 B2 | Page 1 of 1 |
| APPLICATION NO. | : 12/573131 | |
| DATED | : March 27, 2012 | |
| INVENTOR(S) | : Sean E. Landwehr et al. | |

It is certified that error appears in the above-identified patent and that said Letters Patent is hereby corrected as shown below:

On the Title Page, in Item (56), under "OTHER PUBLICATION", in Column 2, Line 9, delete "Dioboride" and insert -- Diboride --, therefor.

Signed and Sealed this
Twenty-third Day of April, 2013

Teresa Stanek Rea
*Acting Director of the United States Patent and Trademark Office*